United States Patent
Alderrou et al.

(10) Patent No.: US 9,876,519 B1
(45) Date of Patent: Jan. 23, 2018

(54) METHODS AND APPARATUS FOR AUTOMATED ADAPTATION OF TRANSMITTER EQUALIZER TAP SETTINGS

(71) Applicant: ALTERA CORPORATION, San Jose, CA (US)

(72) Inventors: Donald Alderrou, Sunnyvale, CA (US); Peng Li, Palo Alto, CA (US); Weiqi Ding, Fremont, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 15/582,164

(22) Filed: Apr. 28, 2017

Related U.S. Application Data

(63) Continuation of application No. 13/597,618, filed on Aug. 29, 2012, now Pat. No. 9,680,675.

(51) Int. Cl.
*H04B 1/38* (2015.01)
*H04B 17/309* (2015.01)
*H04L 27/01* (2006.01)

(52) U.S. Cl.
CPC ............ *H04B 1/38* (2013.01); *H04B 17/309* (2015.01); *H04L 27/01* (2013.01)

(58) Field of Classification Search
CPC .......... H04B 1/38; H04B 17/309; H04L 27/01
See application file for complete search history.

(56) References Cited

U.S. PATENT DOCUMENTS

| | | | |
|---|---|---|---|
| 7,698,483 B2 | 4/2010 | Pettey et al. | |
| 7,852,964 B2* | 12/2010 | Rajappan | H04B 7/0413 340/10.2 |
| 7,917,658 B2 | 3/2011 | Pettey et al. | |
| 2005/0102437 A1 | 5/2005 | Pettey et al. | |
| 2005/0134307 A1* | 6/2005 | Stojanovic | H04L 25/028 326/31 |
| 2008/0080607 A1* | 4/2008 | Shah | H04L 25/03019 375/232 |
| 2008/0107165 A1* | 5/2008 | Nicolescu | H04L 25/03057 375/232 |
| 2008/0288664 A1 | 11/2008 | Pettey et al. | |
| 2009/0110043 A1* | 4/2009 | Mellitz | H04L 1/20 375/231 |
| 2010/0327924 A1* | 12/2010 | Hasegawa | H04L 25/03885 327/155 |
| 2011/0304369 A1* | 12/2011 | Hu | H03L 7/0814 327/161 |

(Continued)

*Primary Examiner* — Jaison Joseph
(74) *Attorney, Agent, or Firm* — Okamoto & Benedicto LLP

(57) ABSTRACT

One embodiment relates to a method of automated adaptation of a transmitter equalizer. A multi-dimensional search space of tap settings for the transmitter equalizer is divided into multiple single-dimensional search spaces, each single-dimensional search space being associated with a single tap of the transmitter equalizer. The multiple single-dimensional search spaces are searched in series, and a tap for a single-dimensional search space is set before searching a next single-dimensional search space. Another embodiment relates to a transceiver with adaptation circuitry configured to implement the above-described method. Other embodiments, aspects, and features are also disclosed.

17 Claims, 8 Drawing Sheets

(56) References Cited

U.S. PATENT DOCUMENTS

2012/0059957 A1   3/2012  Millsaps
2014/0004803 A1*  1/2014  Soler Garrido .......... H04B 7/04
                                                               455/73

* cited by examiner

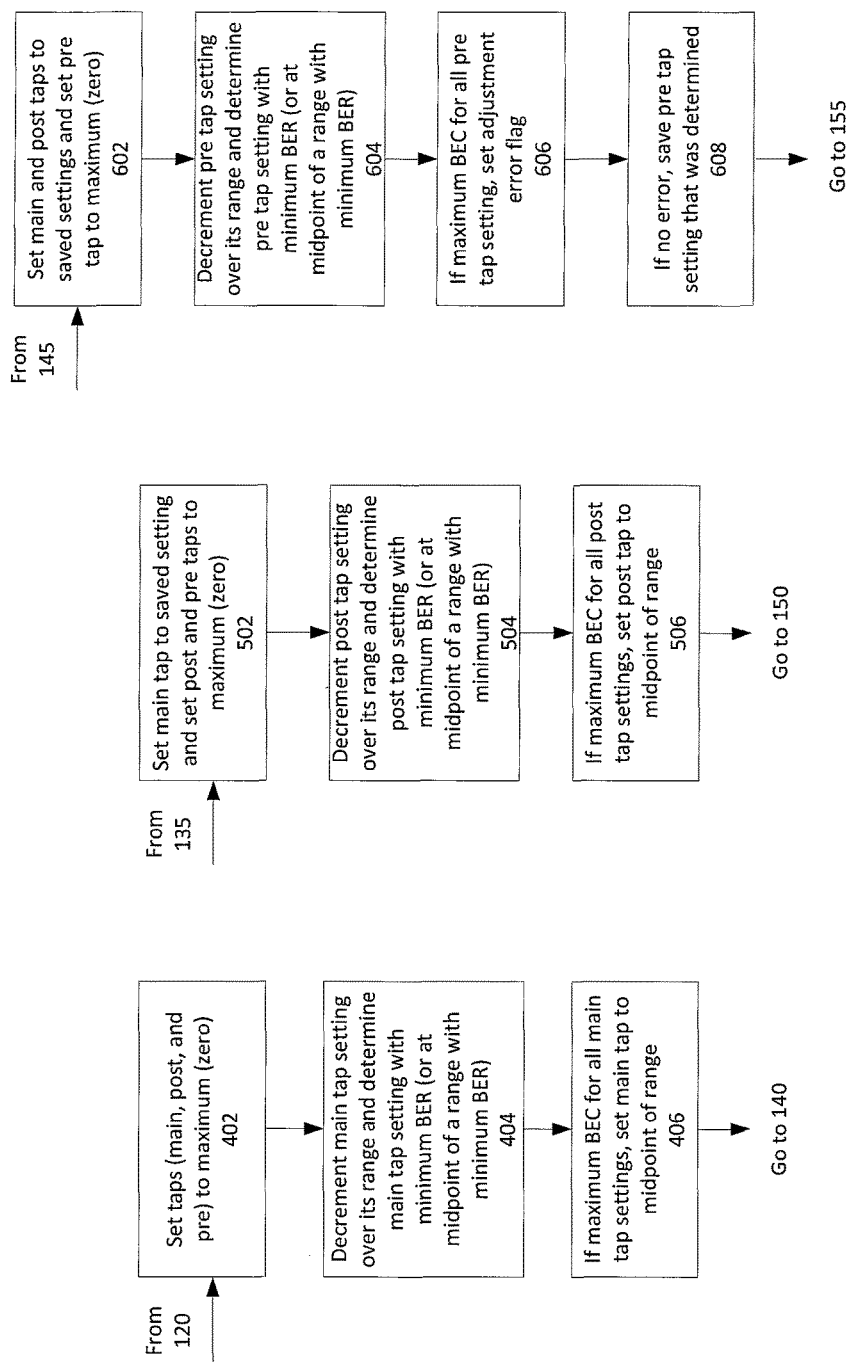

METHODS AND APPARATUS FOR AUTOMATED ADAPTATION OF TRANSMITTER EQUALIZER TAP SETTINGS

CROSS-REFERENCE TO RELATED APPLICATION(S)

This application is a continuation of U.S. patent application Ser. No. 13/597,618, filed Aug. 29, 2012, the disclosure of which is hereby incorporated by reference.

BACKGROUND

Technical Field

The present invention relates generally to data networking and communication circuits.

Description of the Background Art

Networking switch cards, networking line cards, and blade computers communicate via electrical backplanes. The electrical signaling across these backplanes often needs to employ transmit equalization, also called pre-emphasis or de-emphasis, for the communication to be reliable. Depending upon which slots the cards are located and which cards are connected together, the transmitter equalizer settings require different values, or tap coefficients, for proper communication.

Many of the devices sold today have a 3-tap transmitter (TX) linear equalizer while some newer devices have transmitters with 4-tap TX equalizers. The main tap usually has 64 settings, while the post-tap and pre-tap generally have somewhat less adjustability at 32 and 16 settings, respectively.

Blade server manufacturers characterize each device in each slot for each setting to find appropriate values for all configurations. When a new card is inserted into the server, the system management software must have knowledge of the card and the equalizer settings for proper operation.

To enable greater interoperability between card manufacturers, server system manufacturers, and component/device manufacturers, different standards bodies have created automatic link training protocols. The link training protocols, also called auto-negotiation or dynamic equalization or protocol training, allow the devices and cards to exchange information and issue commands to each other.

SUMMARY

One embodiment relates to a method of automated adaptation of a transmitter equalizer. A multi-dimensional search space of tap settings for the transmitter equalizer is divided into multiple single-dimensional search spaces, each single-dimensional search space being associated with a single tap of the transmitter equalizer. The multiple single-dimensional search spaces are searched in series, and a tap for a single-dimensional search space is set before searching a next single-dimensional search space. Another embodiment relates to a transceiver with adaptation circuitry configured to perform this method.

Another embodiment relates to a method of rapidly selecting tap values for a transmitter equalizer. The tap values are set to the initialize setting. A bit error rate for the initialize setting is determined, and an indication is made to the transmitter to use the initialize setting if the bit error rate for the initialize setting is determined to be zero. In addition, the tap values may be set to a preset setting if the bit error rate for the initialize setting is determined to be non-zero. The bit error rate for the preset setting may then be determined, and an indication may be made to the transmitter to use the preset setting if the bit error rate for the preset setting is determined to be zero. Another embodiment relates to a transceiver with adaptation circuitry configured to perform this method.

Other embodiments, aspects, and features are also disclosed.

BRIEF DESCRIPTION OF THE DRAWINGS

FIG. 4 is a flow chart of a method of selecting a main tap setting in accordance with an embodiment of the invention.

FIG. 5 is a flow chart of a method of selecting a post tap setting in accordance with an embodiment of the invention.

FIG. 6 is a flow chart of a method of selecting a pre tap setting in accordance with an embodiment of the invention.

DETAILED DESCRIPTION

Figure 1:
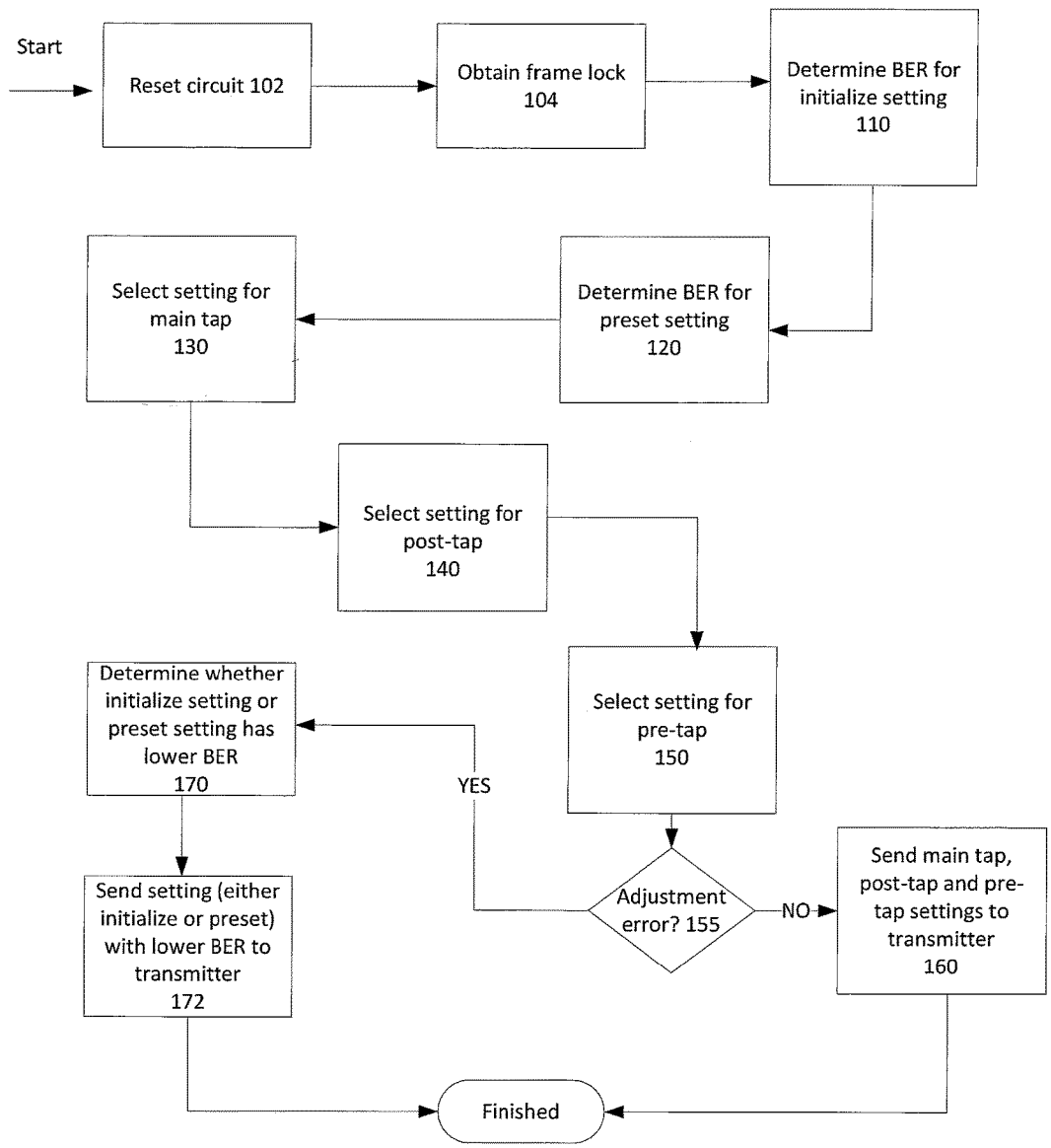
FIG. 1 is a flow chart of a method for automated adaptation of transmitter equalizer tap settings in accordance with an embodiment of the invention.

While the IEEE 802.3ap (Backplane Ethernet) standard defines a link training mechanism, it specifically states in clause 72.6.10.2.3 that the receiver adaptation algorithm is outside of the scope of the standard. The PCI Express® 3.0 specification has is a similar link training mechanism defined, though the specific handshaking protocol between the link partners is different. The PCI Express® 3.0 design employs 10 pre-sets for its TX equalization tap values which is a subgroup of all possible transmitter equalization tap values with the same "out of scope" language for the receiver adaptation algorithm. One previous technique for the PCI Express® 3.0 coefficient algorithm adaptation employs a programmable state machine to search through the pre-set values for the one specific pre-set with the optimal value.

The technique disclosed herein is fundamentally different from the prior technique for the PCI Express® 3.0 design as the presently-disclosed technique advantageously utilizes increment and decrement commands of a link partner handshake mechanism. With separate increment/decrement commands for each equalization tap setting, all of the possible values may be included in the search space of this technique.

Many offset calibration state machines, automatic voltage reference adjustment circuits, or duty-cycle-distortion (DCD) calibration logic search a single dimension/variable to find the optimal settings. The presently-disclosed technique is differentiated as it divides or splits a single multi-dimensional (for example, three-dimensional or four-dimensional) search space into multiple (for example, three or four) separate, orthogonal (or largely orthogonal) one-dimensional search spaces.

The presently-disclosed technique may be implemented as a state machine in either programmable or hard-wired circuitry. It may also be implemented using program code that is executed by an embedded processor. The presently-disclosed technique is generic enough to be used for other applications, in addition to Backplane Ethernet.

Currently system manufacturers characterize the electrical backplane links with different devices, create multi-dimensional "Christmas Tree Plots," and have a person looking at the plots to decide which values to use for the TX equalization tap values. Having the tap values set in a rapid manner with the presently-disclosed methods and apparatus provides a distinct advantage by reducing the bring-up time of the system.

Additionally, the sweet spot in the plots moves over time as the devices age. This can cause the links to become unreliable or need to be re-characterized. With the automated technique of the present disclosure, the tap settings may be optimized each time the device is reset and will thus adjust for age related degradation.

In addition, the programmability of the presently-disclosed methods and apparatus allows for different implementations for the different systems and also for other communication protocols, such as links with a new or custom electrical signaling.

FIG. 1 is a flow chart of a method 100 for automated adaptation of transmitter equalizer tap settings in accordance with an embodiment of the invention. The method 100 may be performed, for example, during the training of a data link between two transceivers such as described below in relation to FIG. 8.

As shown, the method 100 begins by resetting the circuit per block 102 and then obtaining a frame lock per block 104. Thereafter, a procedure may be performed per block 110 to determine the bit error rate (BER) for the initialize values of the transmitter equalizer tap settings (the "initialize setting"). One embodiment of the procedure to determine the BER for the initialize setting is described below in relation to FIG. 2.

Subsequently, a procedure may be performed per block 120 to determine the BER for preset values of the transmitter equalizer tap settings (the "preset setting"). One embodiment of the procedure to determine the BER for the preset setting is described below in relation to FIG. 3.

Thereafter, an efficient technique (involving blocks 130, 140 and 150) may be utilized to determine the transmitter equalizer tap settings in an adaptive manner which depends on the specific link. This technique simplifies a combined multi-dimensional space of potential settings into multiple single-dimensional spaces, one for each tap setting.

In the embodiment shown in FIG. 1, the technique first explores the single-dimensional space associated with the main (voltage output differential or VOD) tap so as to determine, per block 130, the setting for the main tap. One embodiment of the procedure of block 130 to select the setting for the main tap is described below in relation to FIG. 4.

After the procedure of block 130, the technique moves on to block 140, where, given the main (VOD) tap setting, the single-dimensional space associated with the post-tap is explored so as to determine or select the setting for the post-tap. One embodiment of the procedure of block 140 to select the setting for the post-tap is described below in relation to FIG. 5.

After the procedure of block 140, the technique moves on to block 150, where, given the main tap and post-tap settings, the single-dimensional space associated with the pre-tap is explored so as to determine the setting for the pre-tap. One embodiment of the procedure of block 150 to select the setting for the pre-tap is described below in relation to FIG. 6.

An adjustment error may occur during the procedure of block 150. As indicated by block 155, if an adjustment error occurs, then the procedure of block 170 may be performed. Per block 170, a determination may be made as to whether the initialize setting or the preset setting has a lower BER. Whichever setting (initialize or preset) has the lower BER is sent to the transmitter per block 180.

Otherwise, if an adjustment error does not occur in the procedure of block 150, then the technique moves on to block 160. Per block 160, the main tap setting determined in block 130, the post-tap setting determined in block 140, and the pre-tap setting determined in block 150 are sent to the transmitter. The transmitter may then use these settings for the main, post and pre tap settings of the pre-emphasis equalizer at the transmitter.

In an alternate embodiment, the individual one-dimensional setting spaces may be searched using a search procedure for a single-variable search space. For example, the quicksort algorithm may be used.

In another embodiment, receiver eye diagram analysis may be employed (instead of BER minimization) for evaluation of the tap settings. This method would not have the link partner requirement of sending a known data pattern.

Figure 2:
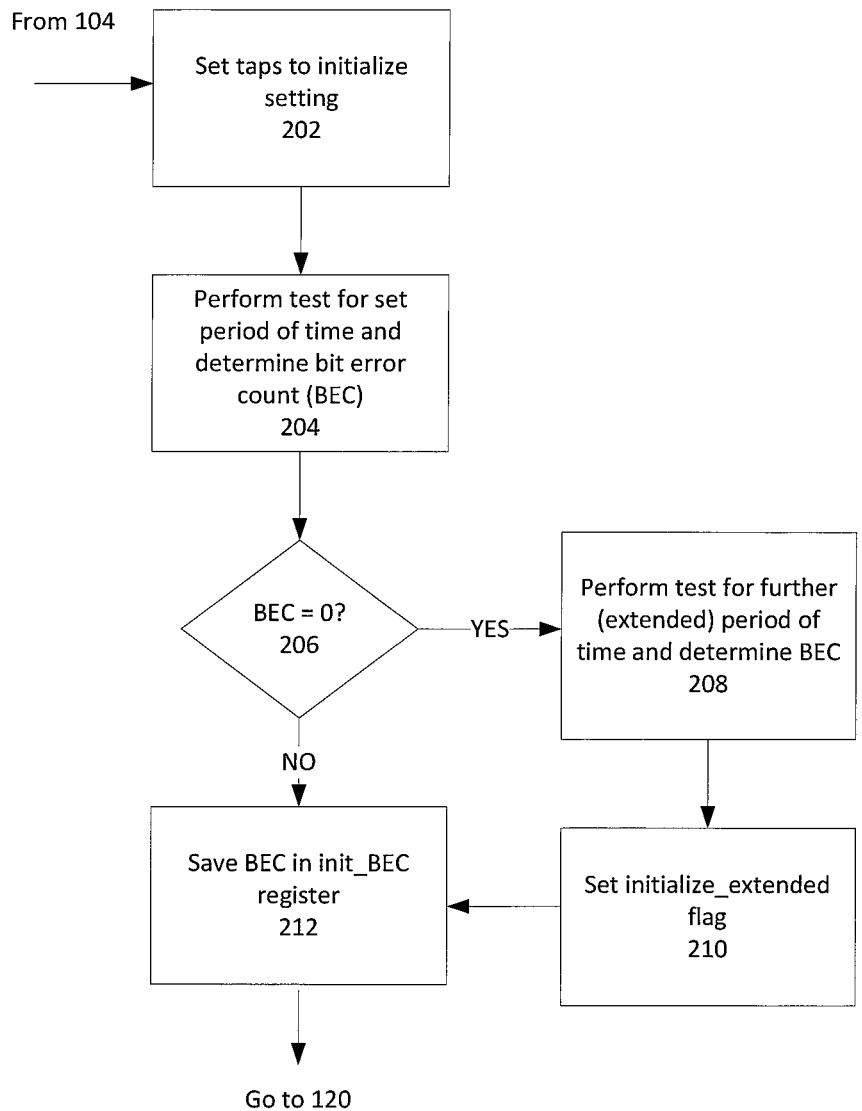
FIG. 2 is a flow chart of a method for determining a bit error rate for the initialize setting in accordance with an embodiment of the invention.

FIG. 2 is a flow chart of a method 110 for determining a bit error rate (BER) for an initialize setting in accordance with an embodiment of the invention. The method of FIG. 2 shows an exemplary embodiment of a procedure for block 110 in FIG. 1.

Per block 202, the taps (main, post and pre) for the pre-emphasis equalizer of the transmitter are set to the initialize setting. The initialize setting for the main, post and pre taps may be predefined tap settings to be used upon initialization of the training mode of operation for the data link.

With the taps set to the initialize setting, testing of the link, per block 204, may be performed for a predetermined initial period of time, and a bit error count (BEC) may be determined from that testing. The testing of the link may involve sending and receiving training frames between link partners. A pseudo-random bit sequence (PRBS) pattern may be sent over the link and erroneous bits may be counted to determine the BEC. The PRBS may be generated using a shift register with binary feedback. For example, the PRBS may be PRBS 11 which is a pseudo random sequence of $(2^{11}-1)$ non-repeating bits. More generally, the PRBS may be PRBS N which is a pseudo random sequence of $(2^N-1)$ non-repeating bits.

Per block 206, a determination may be made as to whether the BEC (found in block 204) is zero. If the BEC is determined per block 206 to be non-zero, then the BEC may be saved into an init_BEC register per block 212. In this case, an initialize_extended flag remains clear (un-set) to indicate that the testing was only over the initial period of time during which an initial number of bits was transferred. In this case, the BER for the initialize setting may be determined to be the BEC in the init_BEC register divided by the initial number of transferred bits.

On the other hand, if the BEC is determined per block 206 to be zero, then the testing of the link may be performed for a predetermined further (extended) period of time, per block 328, and the BEC may be determined. The further period of time may be configurable (for example, to a multiple of the initial period of time) to provide a reasonable chance that a bit error will be counted. In this case, the initialize_extended flag may be set to indicate that the testing of the initialize setting was continued for the extended period of time during which an extended number of bits was transferred. Subsequently, the BEC may be saved into an initialize_BEC register. Thus, in this case, the BER for the initialize setting may be determined to be the BEC in the initialize_BEC register divided by the total number of transferred bits (the initial number of transferred bits plus the extended number of transferred bits).

Figure 3:
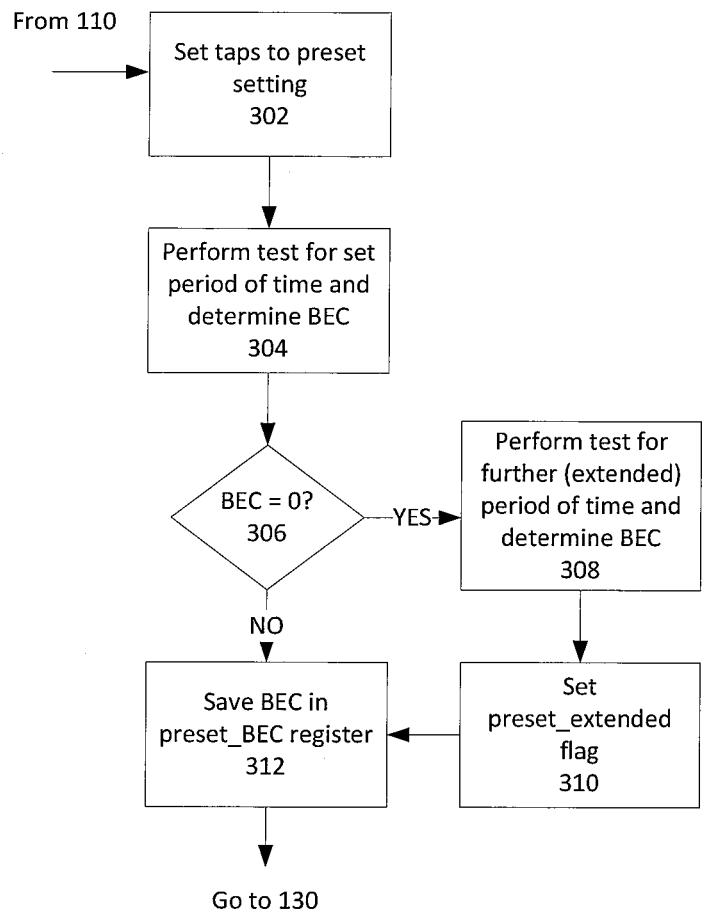
FIG. 3 is a flow chart of a method of determining a bit error rate for a preset setting in accordance with an embodiment of the invention.

FIG. 3 is a flow chart of a method of determining a bit error rate for a preset setting in accordance with an embodiment of the invention. The method of FIG. 3 shows an exemplary embodiment a procedure for block 120 in FIG. 1.

Per block 302, the taps (main, post and pre) for the pre-emphasis equalizer of the transmitter are set to the preset setting. The preset setting for the main, post and pre taps may be predefined tap settings and may be suggested by a standard specification, for example. The setting of the taps for the transmitter equalizer may be accomplished by commands sent handshake circuitry at the receiver to adaptation circuitry at the transmitter.

With the taps set to the preset setting, testing of the link, per block 304, may be performed for a predetermined initial period of time, and a BEC may be determined from that testing. As described above, the testing of the link may involve sending and receiving training frames between link partners, and a PRBS pattern may be sent over the link and erroneous bits may be counted to determine the BEC.

Per block 306, a determination may be made as to whether the BEC (found in block 304) is zero. If the BEC is determined per block 306 to be non-zero, then the BEC may be saved into a preset_BEC register per block 312. In this case, a preset_extended flag remains clear (un-set) to indicate that the testing was only over the initial period of time during which an initial number of bits was transferred. In this case, the BER for the preset setting may be determined to be the BEC in the init_BEC register divided by the initial number of transferred bits.

On the other hand, if the BEC is determined per block 306 to be zero, then the testing of the link may be performed for a predetermined further (extended) period of time, per block 308, and the BEC may be determined. The further period of time may be configurable (for example, to a multiple of the initial period of time) to provide a reasonable chance that a bit error will be counted. In this case, the preset_extended flag may be set to indicate that the testing of the preset setting was continued for the extended period of time during which an extended number of bits was transferred. Subsequently, the BEC may be saved into the preset_BEC register. Thus, in this case, the BER for the preset setting is determined to be the BEC in the preset_BEC register divided by the total number of transferred bits (the initial number of transferred bits plus the extended number of transferred bits).

FIG. 4 is a flow chart of a method of selecting a main tap setting in accordance with an embodiment of the invention. The method of FIG. 4 shows an exemplary embodiment a procedure for block 130 in FIG. 1.

Per block 402, the main tap, post tap, and pre tap of the transmitter equalizer are set to their maximum values. In accordance with an embodiment of the invention, the maximum value of each tap may be zero.

Per block 404, the main tap setting may decremented one setting at a time over its range, and a determination may be made as to the main tap setting with the minimum BEC. Note that the minimum BEC corresponds to the minimum BER so long as the same number of transferred bits (i.e. the same time period) is used to test each setting. In accordance with an embodiment of the invention, in block 404, if there is a range of main tap settings with the minimum BEC, then the setting at the midpoint of the range may be selected.

In one implementation, if the BEC for the current setting is less than the BEC for the previous setting, then the BEC is saved in a BEC register, and the main tap setting is decremented to the next lower value. If the BEC for the current setting is equal to (the same as) the BEC for the previous setting, then a count of the number of settings to the boundary of a range of settings with minimum BEC may be remembered by incrementing a counter bndry_cnt. Finally, if the BEC for the current setting is greater than the BEC for the previous setting, then one of the previous settings may be selected to be the main tap setting with the minimum BER. The previous setting to be selected may be found by incrementing the main tap setting by bndry_cnt divided by 2. (The remainder, if any, may be ignored.) In other words, the main tap setting may be incremented halfway back to the boundary.

During the method of block 404, the BEC for each setting over the entire range of main tap settings may be at the maximum number for the counter used. If this is the case, then the main tap may be set to a midpoint of its range per block 406.

FIG. 5 is a flow chart of a method of selecting a post tap setting in accordance with an embodiment of the invention. The method of FIG. 5 shows an exemplary embodiment of a procedure for block 140 of FIG. 1.

Per block 502, the main tap of the transmitter equalizer is set to the setting determined in block 130, and the post tap and pre tap of the transmitter equalizer are set to their maximum values. In accordance with an embodiment of the invention, the maximum value of each tap may be zero.

Per block 504, the post tap setting may decremented one setting at a time over its range, and a determination may be made as to the post tap setting with the minimum BEC. Note that the minimum BEC corresponds to the minimum BER so long as the same number of transferred bits (i.e. the same time period) is used to test each setting. In accordance with an embodiment of the invention, in block 504, if there is a range of post tap settings with the minimum BEC, then the setting at the midpoint of the range may be selected.

In one implementation, if the BEC for the current setting is less than the BEC for the previous setting, then the BEC is saved in a BEC register, and the post tap setting is decremented to the next lower value. If the BEC for the current setting is equal to (the same as) the BEC for the previous setting, then a count of the number of settings to the boundary of a range of settings with minimum BEC may be remembered by incrementing a counter bndry_cnt. Finally, if the BEC for the current setting is greater than the BEC for the previous setting, then one of the previous settings may be selected to be the post tap setting with the minimum BER. The previous setting to be selected may be found by incrementing the post tap setting by bndry_cnt divided by 2. (The remainder, if any, may be ignored.) In other words, the post tap setting may be incremented halfway back to the boundary.

During the method of block 504, the BEC for each setting over the entire range of post tap settings may be at the maximum number for the counter used. If this is the case, then the post tap may be set to a midpoint of its range per block 506.

FIG. 6 is a flow chart of a method of selecting a pre tap setting in accordance with an embodiment of the invention. The method of FIG. 6 shows an exemplary embodiment of a procedure for block 150 of FIG. 1.

Per block 602, the main and post taps of the transmitter equalizer are set to the setting selected in blocks 130 and 140, and the pre tap of the transmitter equalizer are set to its maximum value. In accordance with an embodiment of the invention, the maximum value of the pre tap may be zero.

Per block 604, the pre tap setting may decremented one setting at a time over its range, and a determination may be made as to the pre tap setting with the minimum BEC. Note that the minimum BEC corresponds to the minimum BER so long as the same number of transferred bits (i.e. the same time period) is used to test each setting. In accordance with an embodiment of the invention, in block 604, if there is a range of pre tap settings with the minimum BEC, then the setting at the midpoint of the range may be selected.

In one implementation, if the BEC for the current setting is less than the BEC for the previous setting, then the BEC is saved in a BEC register, and the pre tap setting is decremented to the next lower value. If the BEC for the current setting is equal to (the same as) the BEC for the previous setting, then a count of the number of settings to the boundary of a range of settings with minimum BEC may be remembered by incrementing a counter bndry_cnt. Finally, if the BEC for the current setting is greater than the BEC for the previous setting, then one of the previous settings may be selected to be the pre tap setting with the minimum BER. The previous setting to be selected may be found by incrementing the pre tap setting by bndry_cnt divided by 2. (The remainder, if any, may be ignored.) In other words, the pre tap setting may be incremented halfway back to the boundary.

During the method of block 604, the BEC for each setting over the entire range of pre tap settings may be at the maximum number for the counter used. If this is the case, then an error in the process has been detected, and the adjustment error flag may be set per block 606. Otherwise, if there was no error, then the pre tap setting that was selected may be saved per block 608.

Figure 7:
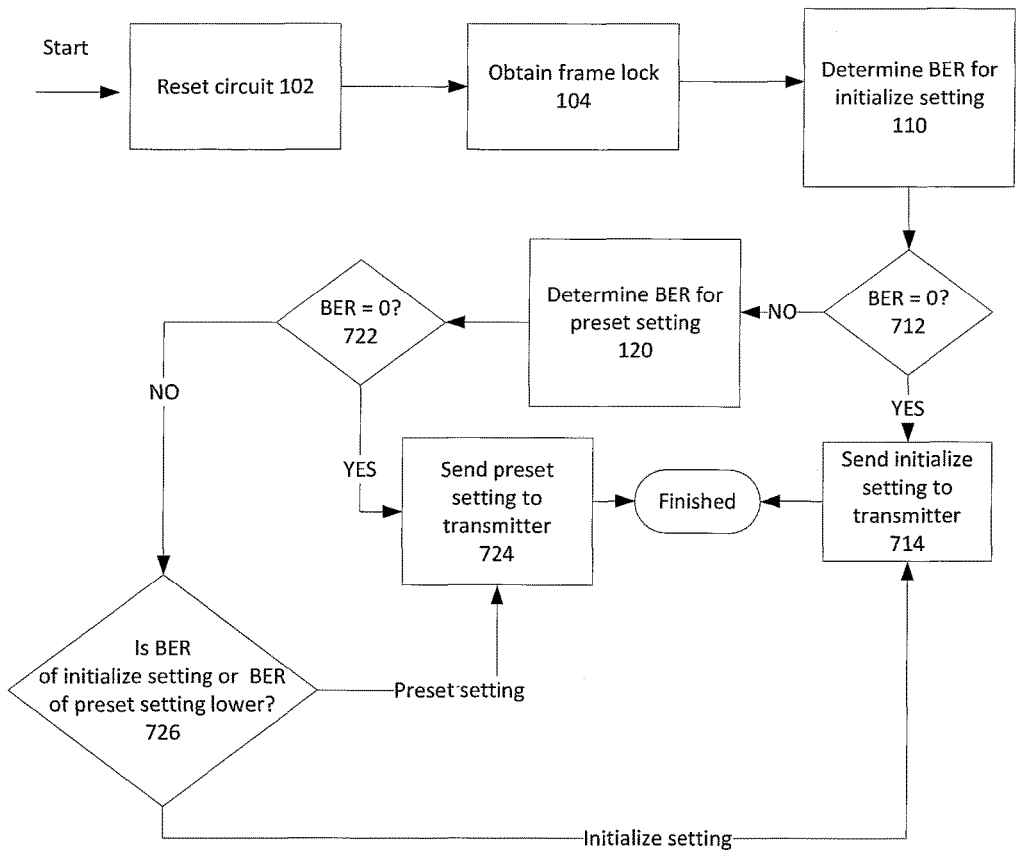
FIG. 7 is a flow chart of an automated method for rapidly selecting transmitter equalizer tap settings in accordance with an embodiment of the invention.

FIG. 7 is a flow chart of an automated method 700 for rapidly selecting transmitter equalizer tap settings in accordance with an embodiment of the invention. The method 700 may be performed, for example, during the training of a data link between two transceivers such as described below in relation to FIG. 8. The rapid selection method 700 of FIG. 7 may be implemented as a configurable alternate mode to the more accurate adaptive selection method 100 of FIG. 1.

As shown, the method 700 begins by resetting the circuit per block 102 and then obtaining a frame lock per block 104. Thereafter, a procedure may be performed per block 110 to determine the BER for the initialize values of the transmitter equalizer tap settings (the "initialize setting"). One embodiment of the procedure to determine the BER for the initialize setting is described above in relation to FIG. 2.

Subsequently, per block 712, a determination may be made as to whether the BER determined in block 110 is zero. As described above, the BER may be determined to be zero in block 110 if the bit error count (BEC) is zero in both the initial and extended period of time.

If the BER is determined to be zero in block 712, then the method 700 may determine that the initialize setting is satisfactory. Hence, the initialize setting is sent to the transmitter per block 714, and the method 700 is then complete.

On the other hand, if the BER is determined to be non-zero in block 712, then a procedure may be performed per block 120 to determine the BER for preset values of the transmitter equalizer tap settings (the "preset setting"). One embodiment of the procedure to determine the BER for the preset setting is described above in relation to FIG. 3.

Subsequently, per block 722, a determination may be made as to whether the BER determined in block 120 is zero. As described above, the BER may be determined to be zero in block 120 if the BEC is zero in both the initial and extended period of time.

If the BER is determined to be zero in block 722, then the method 700 may determine that the preset setting is satisfactory. Hence, the preset setting is sent to the transmitter per block 724, and the method 700 is then finished.

On the other hand, if the BER is determined to be non-zero in block 722, then a determination may be made per block 726 as to whether the initialize setting or the preset setting has a lower BER. If the initialize setting has the lower BER, then the initialize setting is sent to the transmitter per block 714. Otherwise, if the preset setting has the lower BER, then the preset setting is sent to the transmitter per block 716. The method 700 is then finished.

Figure 8:
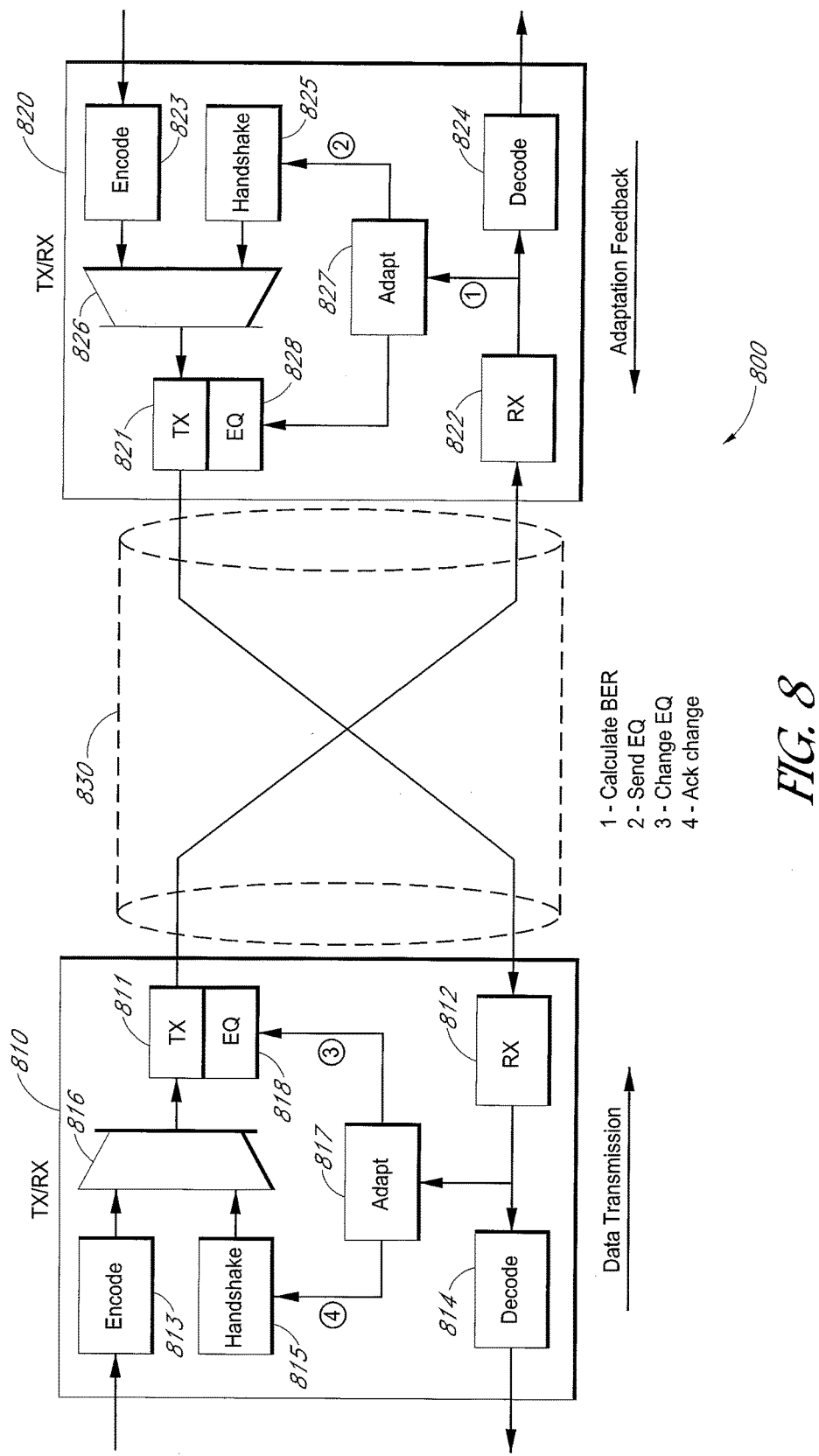
FIG. 8 depicts two transceivers connected by a data link in accordance with an embodiment of the invention.

FIG. 8 depicts two transceivers (TX/RX 810 and TX/RX 820) connected by a data link in accordance with an embodiment of the invention.

As depicted, the first transceiver TX/RX 810 includes, among other components, a transmitter (TX) circuit 811, a receiver (RX) circuit 812, an encode circuit 813, a decode circuit 814, handshake circuitry 815, a controllable selector (multiplexer) 816, adaptation circuitry 817, and a transmitter equalizer (EQ) circuit 818. During data transmission, data to be transmitted may be received from an integrated circuit core, encoded by the encode circuit 813, and sent via the selector 816 to the TX circuit 811. Pre-emphasis equalization may be performed by the EQ circuit 818 prior to transmission of the signal over the channel 830. During data reception, data may be received from the channel 830 by the RX circuit 812. The received data may be decoded by the decoder 814 and then provided to the integrated circuit core that is coupled to the TX/RX 810.

Similarly, the second transceiver TX/RX 820 includes, among other components, a transmitter (TX) circuit 821, a receiver (RX) circuit 822, an encode circuit 823, a decode circuit 824, handshake circuitry 825, a controllable selector (multiplexer) 826, adaptation circuitry 827, and a transmitter equalizer (EQ) circuit 828. During data transmission, data to be transmitted may be received from an integrated circuit core, encoded by the encode circuit 823, and sent via the selector 826 to the TX circuit 821. Pre-emphasis equalization may be performed by the EQ circuit 828 prior to transmission of the signal over the channel 830. During data reception, data may be received from the channel 830 by the RX circuit 822. The received data may be decoded by the decoder 824 and then provided to the integrated circuit core that is coupled to the TX/RX 820.

As relevant to the present disclosure, actions relevant to link training are shown in FIG. 8. In a first action (1), the adaptation circuitry 827 in the second TX/RX 820 may calculate the bit error rate (BER) information from the known pattern of data received by the RX circuit 822. In particular, the adaptation circuitry may implement, for example, the automated method 100 described above in relation to FIG. 1, or the automated method 700 described above in relation to FIG. 7.

In a second action (2), the selected transmitter equalizer tap settings may be communicated via the handshake circuitry 825 to the adaptation circuitry 817 of the first TX/RX 810. In this training mode, the selector 826 selects the output from the handshake circuitry 825 to be sent by the transmitter 821 over the channel 830 to the receiver 812 of the first TX/RX 810.

In a third action (3), the adaptation circuitry 817 of the first TX/RX 810 may then change (adapt) the tap settings of the transmitter equalizer 818 in accordance with the tap settings received from the second TX/RX 820. In addition, in a fourth action (4) the changing of the tap settings may be acknowledged by returning an appropriate acknowledge change (ack change) message via the handshake circuitry 815 to the adaptation circuitry 827 of the second TX/RX 820.

The actions (1-4) described above pertain to training the transmitter equalizer 818 of the first TX/RX 810. The mirror image of those actions may be used to train the transmitter equalizer 828 of the second TX/RX 820.

Figure 9:
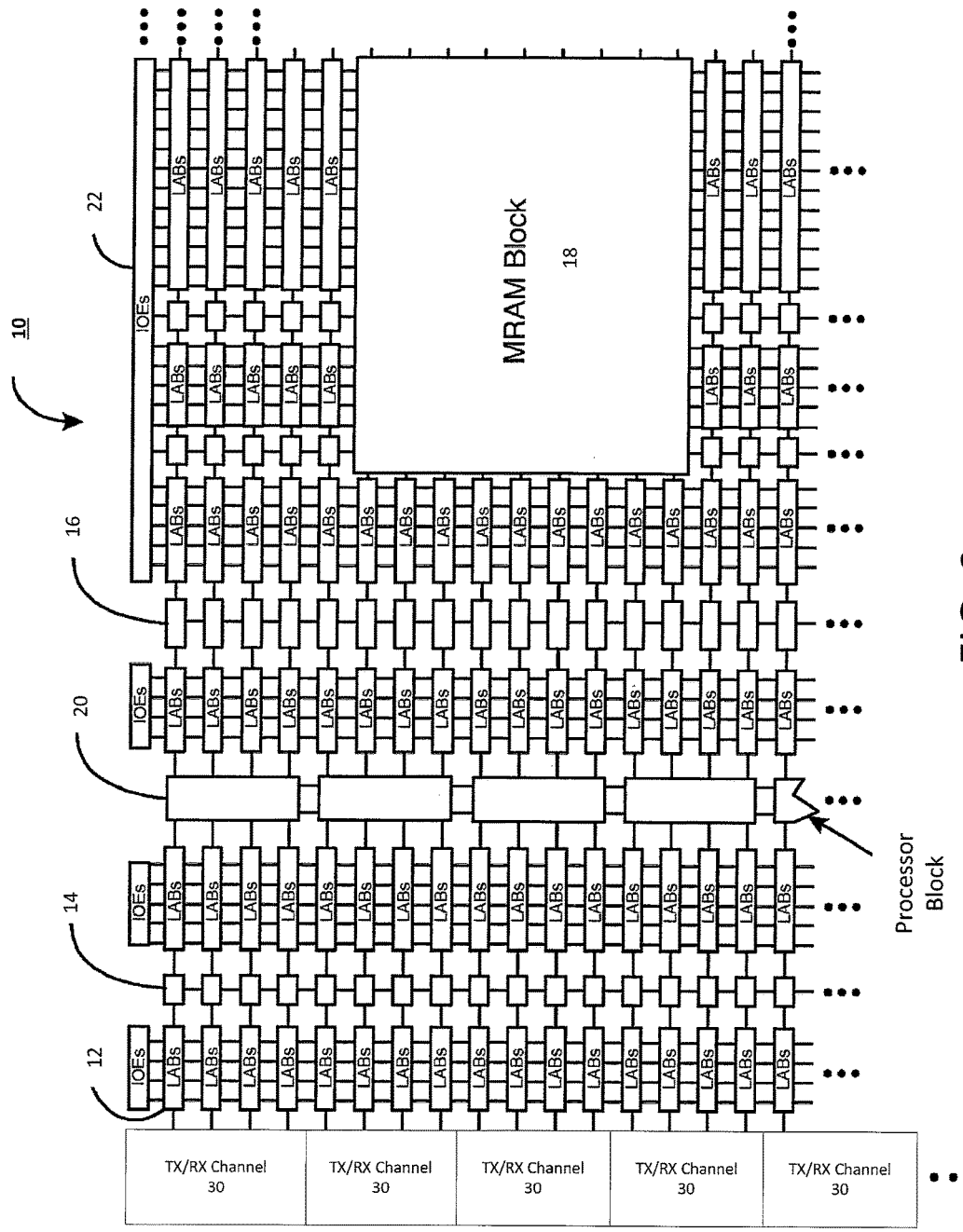
FIG. 9 is a simplified partial block diagram of an exemplary field programmable gate array (FPGA) that may be configured to implement an embodiment of the present invention.

FIG. 9 is a simplified partial block diagram of an exemplary field programmable gate array (FPGA) 10 that may be configured to implement an embodiment of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs). A LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include one or more embedded processor blocks 20. The embedded processor blocks 20 may execute program instruction code stored in memory (either volatile or non-volatile) on the FPGA 10.

Input/output elements (IOEs) 22 located, in this example, around the periphery of the chip support numerous single-ended and differential input/output standards. Each IOE 22 is coupled to an external terminal (i.e., a pin) of FPGA 10.

A transceiver (TX/RX) channel array may be arranged as shown, for example, with each TX/RX channel circuit 30 being coupled to several LABs. Each TX/RX channel circuit 30 may include, among other circuitry, transmitter equalizer (TX EQ) circuitry with taps that may be set in an adaptive manner as described herein.

Logic for controlling the adaptive setting of the TX EQ taps may be implemented in using the LABs 12 of the FPGA 10. Alternatively, the control logic may be implemented in hardwired circuitry connected to a TX/RX channel circuit 30. As another alternative, the control logic may be implemented in program code that is executed by an embedded processor in the FPGA 10.

It is to be understood that FPGA 10 is described herein for illustrative purposes only and that the present invention can be implemented in many different types of PLDs, FPGAs, and ASICs.

Figure 10:
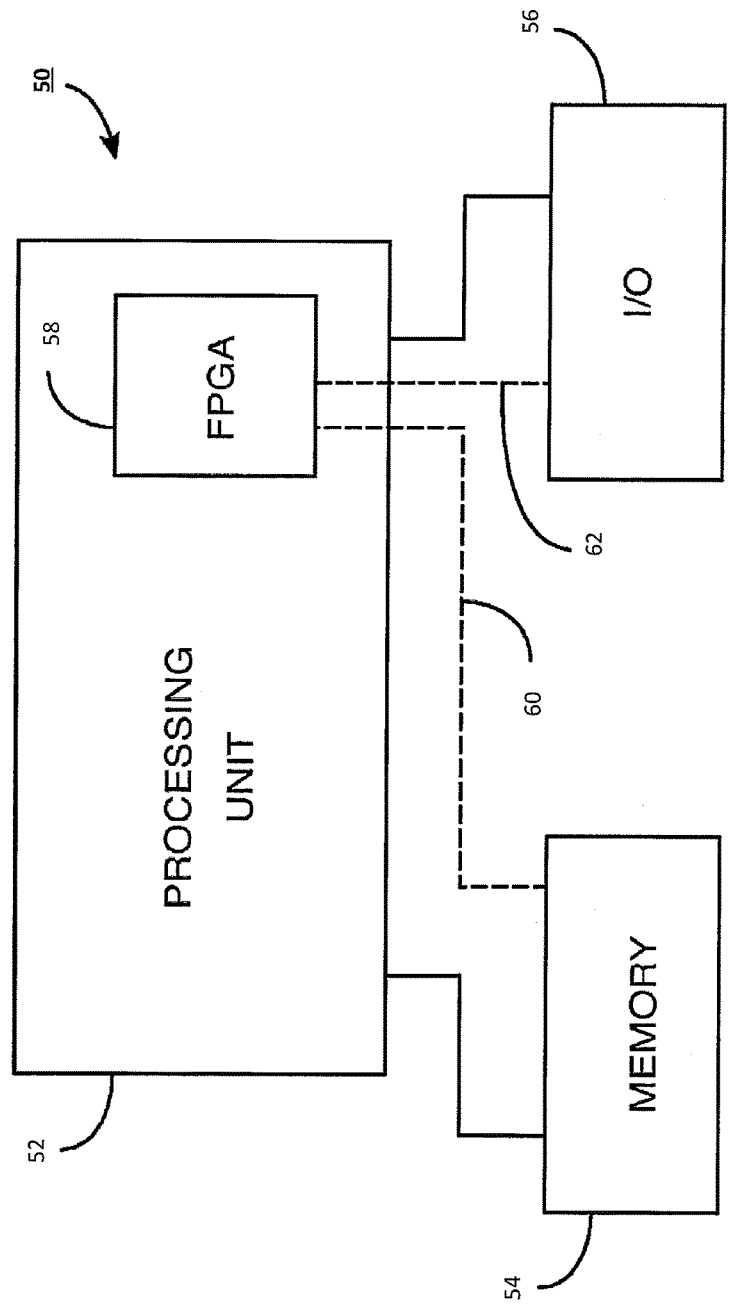
FIG. 10 shows a block diagram of an exemplary digital system that may employ techniques as disclosed herein.

FIG. 10 shows a block diagram of an exemplary digital system 50 that may employ techniques disclosed herein. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of automated adaptation of a transmitter equalizer in a transmitter, the method comprising:
   dividing a multi-dimensional search space of tap settings for the transmitter equalizer into multiple single-dimensional search spaces, each single-dimensional search space being associated with a single tap of the transmitter equalizer;
   searching the multiple single-dimensional search spaces in series;
   setting a tap for a single-dimensional search space before searching a next single-dimensional search space;
   setting an adjustment error flag during the setting of a pre-tap of the transmitter equalizer when a counter used for a bit error count is at a maximum number for an entire range of the setting for the pre-tap;
   determining whether the adjustment error flag is set;
   sending the tap settings found by the searching to the transmitter when the adjustment error flag is not set, and
   when the adjustment error flag is set, determining bit error rates for multiple predetermined settings, determining a predetermined setting with a lowest bit error rate among the multiple predetermined settings, and selecting the predetermined setting with the lowest bit error rate.

2. The method of claim 1, wherein searching a single-dimensional search space comprises finding a tap value which corresponds to a minimum bit error rate.

3. The method of claim 2, wherein finding the tap value which corresponds to the minimum bit error rate comprises:
   decrementing a current tap value to a next lower value;
   finding a current bit error count for the current tap value;
   comparing the current bit error count for the current tap value with a saved bit error count stored in a register; and
   replacing the saved bit error count with the current bit error count if the current bit error count is less than the saved bit error count.

4. The method of claim 3, wherein finding the tap value which corresponds to the minimum bit error rate further comprises:
   incrementing a boundary count if the current bit error count is equal to the saved bit error count.

5. The method of claim 4, wherein finding the tap value which corresponds to the minimum bit error rate further comprises:
   incrementing the current tap value by the boundary count divided by two if the current bit error count is greater than the saved bit error count.

6. The method of claim 2, wherein a first single-dimensional search space that is searched comprises a voltage output differential tap of the transmitter equalizer.

7. The method of claim 6, wherein a second single-dimensional search space that is searched comprises a post-tap of the transmitter equalizer.

8. The method of claim 7, wherein a third single-dimensional search space that is searched comprises the pre-tap of the transmitter equalizer.

9. The method of claim 1, wherein the multiple predetermined settings comprise an initialize setting and a preset setting.

10. A method of rapidly selecting tap values for a transmitter equalizer of a transmitter, the method comprising:
    setting the tap values to an initialize setting;
    performing a test of the initialize setting for a first period time to determine a first bit error rate for the initialize setting;
    when the first bit error rate for the initialize setting is non-zero, saving the first bit error rate for the initialize setting in an initialize bit error count register;
    when the first bit error rate is zero, performing a further test of the initialize setting for a first extended period of time to determine a second bit error rate for the initialize setting; and
    when the second bit error rate for the initialize setting is determined to be zero, setting an initialize extended flag indicating that the further test of the initialize setting was performed and saving the second bit error rate for the initialize setting in the initialize bit error count register.

11. The method of claim 10 further comprising:
    setting the tap values to a preset setting;
    performing a test of the preset setting for a second period time to determine a first bit error rate for the preset setting;
    when the first bit error rate for the preset setting is non-zero, saving the first bit error rate for the preset setting in a preset bit error count register;
    when the first bit error rate for the preset setting is zero, performing a further test of the preset setting for a second extended period of time to determine a second bit error rate for the preset setting; and
    when the second bit error rate for the preset setting is determined to be zero, setting a preset extended flag indicating that the further test of the preset setting was performed and saving the second bit error rate for the preset setting in the preset bit error count register.

12. A transceiver comprising:
    a receiver circuit of the transceiver for receiving a data signal over a channel from a partner transceiver;
    adaptation circuitry of the transceiver for determining a bit error rate from a known pattern of data received by the receiver circuit;
    handshake circuitry of the transceiver for communicating equalizer tap values for a transmitter equalizer of the partner transceiver; and
    a transmitter circuit arranged to communicate the equalizer tap values from the handshake circuitry of the transceiver to the partner transceiver;
    wherein the adaptation circuitry is configured to
      divide a multi-dimensional search space of equalizer tap values into multiple single-dimensional search spaces, each single-dimensional search space being associated with a single tap of the transmitter equalizer,
      search the multiple single-dimensional search spaces in series,
      set a tap for a single-dimensional search space before searching a next single-dimensional search space,
      set an adjustment error flag during the setting of a pre-tap of the transmitter equalizer when a counter used for a bit error count is at a maximum number for an entire range of the setting for the pre-tap,
      determine whether the adjustment error flag is set,
      send the tap settings found by the searching to the transmitter when the adjustment error flag is not set, and
      when the adjustment error flag is set, determine bit error rates for multiple predetermined settings, determine a predetermined setting with a lowest bit error rate among the multiple predetermined settings, and select the predetermined setting with the lowest bit error rate.

13. The transceiver of claim 12, wherein the adaptation circuitry if further configured to search a single-dimensional search space by finding a tap value which corresponds to a minimum bit error rate.

14. The transceiver of claim 13, wherein finding the tap value which corresponds to the minimum bit error rate comprises:
   decrementing a current tap value to a next lower value;
   finding a current bit error count for the current tap value;
   comparing the current bit error count for the current tap value with a saved bit error count stored in a register; and
   replacing the saved bit error count with the current bit error count if the current bit error count is less than the saved bit error count.

15. The transceiver of claim 14, wherein finding the tap value which corresponds to the minimum bit error rate further comprises:
   incrementing a boundary count if the current bit error count is equal to the saved bit error count; and
   incrementing the current tap value by the boundary count divided by two if the current bit error count is greater than the saved bit error count.

16. The transceiver of claim 13, wherein a first single-dimensional search space that is searched comprises a voltage output differential tap of the transmitter equalizer, a second single-dimensional search space that is searched comprises a post-tap of the transmitter equalizer, and a third single-dimensional search space that is searched comprises the pre-tap of the transmitter equalizer.

17. The transceiver of claim 12, wherein the multiple predetermined settings comprise an initialize setting and a preset setting.

* * * * *